(No Model.)

M. CRAWFORD.
FLOUR DRESSING MACHINE.

No. 287,250.     Patented Oct. 23, 1883.

Witnesses.

Lewis Tomlinson
J. B. Fetherstonhaugh

Inventor.

Middleton Crawford
by Donald C. Ridout & Co.
Attorneys.

UNITED STATES PATENT OFFICE.

MIDDLETON CRAWFORD, OF WIARTON, ONTARIO, CANADA.

FLOUR-DRESSING MACHINE.

SPECIFICATION forming part of Letters Patent No. 287,250, dated October 23, 1883.

Application filed July 5, 1883. (No model.)

*To all whom it may concern:*

Be it known that I, MIDDLETON CRAWFORD, a subject of the Queen of Great Britain, of the village of Wiarton, in the county of Bruce, in the Province of Ontario, Canada, miller, have invented certain new and useful Improvements in Flour-Dressing Machines, of which the following is a specification.

The object of the invention is to devise a machine which will sift flour as thoroughly as a hand-sieve; and it consists in the peculiar construction and arrangement of parts, as hereinafter more fully described and claimed.

Figure 1:
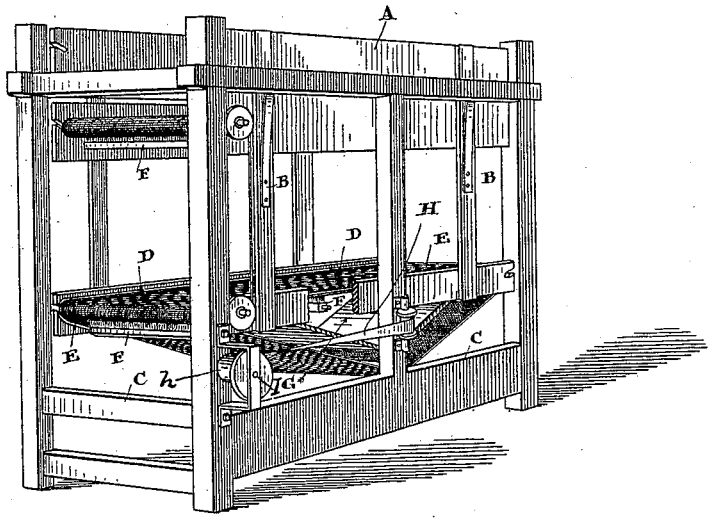
Figure 2:
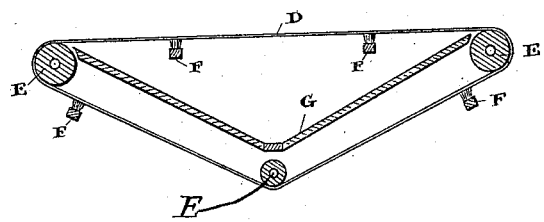

Figure 1 is a perspective view of my improved flour-dressing machine. Fig. 2 is a sectional elevation of sieve and brushes.

Although my invention is designed principally for application in middlings-purifiers, it will also be applicable as a substitute for bolting-reels; but it is not necessary for the purpose of this specification to show it in more than the one application.

A is a horizontal frame, flexibly supported by the hangers B, suspended from the main frame C.

D is an endless web-sieve, made of bolting-cloth or any other suitable material, and supported by the rollers E, which are journaled in the frame A, as indicated, so as to stretch the sieve D and hold the upper surface of the said sieve in a horizontal position. The rollers E are caused to revolve, and when so revolving impart a traveling movement to the sieve D, the frame A, which carries the said rollers, having simultaneously imparted to it a gentle vibratory movement. The fact of this double movement thus imparted to the sieve D will cause the fine flour resting on its upper surface to sift through the sieve, while the coarser—such as bran, &c.—that does not pass through the meshes of the sieve, is carried by the traveling movement of the sieve over its edge, where it is discharged into suitable conveyers for re-sifting.

F are fixed or stationary brushes, set so as to come in contact with the surface of the sieve D in order to clean the meshes of the sieve as it travels over the said brush.

An exhaust or blast fan may be employed in connection with my sieve, as is used in ordinary middlings-purifiers; but as I make no claim to the use of a fan it is not necessary to show it in the drawings.

G is a hopper-shaped receptacle, placed between the sides of the sieve D, so as to catch the flour falling through the top horizontal surface of the sieve. The flour falling into the hopper-shaped receptacle G is carried away by a conveyer, or in any other suitable manner. The figure formed by the arrangement of the rollers E to carry the sieve D leaves a space between the top and bottom of the sieve D sufficiently large to receive the hopper-shaped receptacle G, and to permit the brushes F to be set within it, as indicated. The pipe leading from the blast or exhaust fan will also enter at this point. It will be seen that the brushes F, placed above the hopper-shaped receptacle G, will not only help to support the sieve and prevent it from sagging, but effectually clean the inside of the sieve D, while the brushes F, situated below the receptacle G and against the lower and out side of the sieve D, are designed to effectually clean the outer surface of the sieve D as it travels around the rollers. In the drawings I have shown only two sieves, and in order to illustrate my invention have exaggerated slightly the form of the hopper-shaped receptacle G in the lower sieve.

I do not claim any peculiar mechanism for imparting the vibratory movement to the frames, as any of the ordinary means may be employed. I however show a belt, H, which is connected at one end to the frame A and at the other end to a strap loosely attached to an eccentric or cam, $h$, attached to the shaft I. The revolving of this shaft and eccentric imparts a longitudinal movement to the strap H, which gives a sidewise motion to the frame A in one direction, and a spring (not shown) draws the frame in a contrary direction as the strap slackens during the continued revolution of the eccentric.

I am aware that endless web-sieves are not new in this class of machines, and therefore do not claim, broadly, the use of an endless web-sieve. I deem it important that the rollers supporting the endless sieve should be arranged in a triangular manner, as shown, because when thus arranged less cloth is necessary than where four rollers are used, and yet sufficient space is left for the hopper G.

What I claim as my invention is—

1. In a flour-dressing machine, an endless web-sieve running on rollers mounted in a suitable frame, a receptacle contained within the web-sieve, and a brush arranged to sweep the flour off the under side of the sieve into the receptacle, substantially as and for the purpose specified.

2. In a flour-dressing machine, an endless web-sieve carried on revolving rollers and presenting a horizontal traveling surface, in combination with stationary brushes set so as to come in contact with the under horizontal surface of the sieve, and support the same and clean the meshes thereof as it travels over the brushes, substantially as and for the purpose specified.

3. The endless web-sieve D, carried on revolving rollers E, in combination with the stationary brushes F, arranged, as shown, to clean the meshes of the sieve, both on the inside and outside, as said sieve travels over the brushes, substantially as and for the purpose specified.

Dated at Wiarton this 1st day of May, A. D. 1883.

MIDDLETON CRAWFORD.

In presence of—
  JAMES V. CRAWFORD,
  W. G. TANNERS.